INVENTORS.
THOMAS W. HOWLETT
LAURENCE N. SHUPP
CLARENCE VERBEEK
BY Hume, Groen, Clement & Hume
Attorneys.

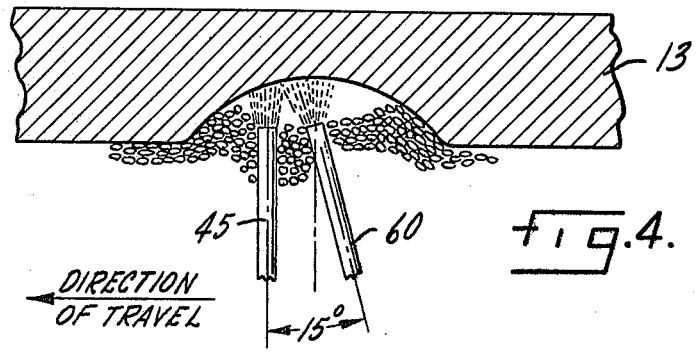
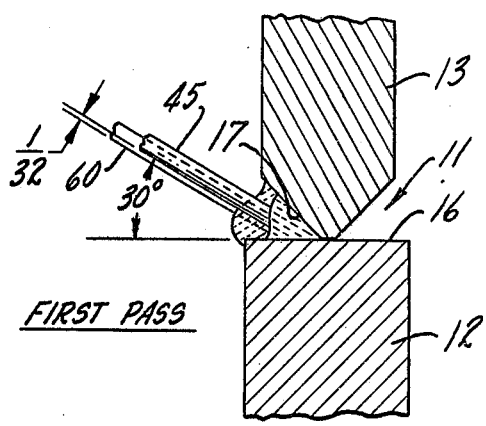
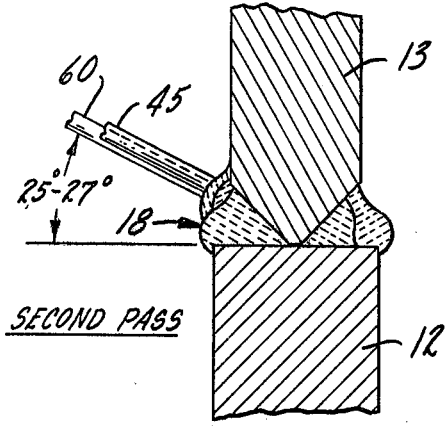
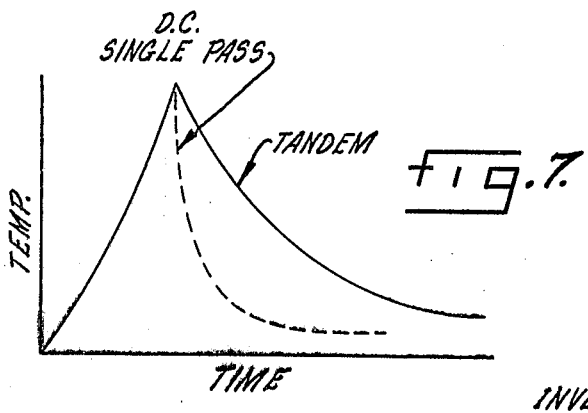

United States Patent Office 3,497,667
Patented Feb. 24, 1970

3,497,667
TANDEM ARC AUTOMATIC WELDING
Thomas W. Howlett, Highland, Ind., Clarence Verbeek, Lansing, Ill., and Laurence N. Shupp, Dyer, Ind., assignors, by mesne assignments, to Union Tank Car Company, a corporation of Delaware
Filed Nov. 28, 1966, Ser. No. 597,294
Int. Cl. B23k 9/12
U.S. Cl. 219—126     8 Claims

ABSTRACT OF THE DISCLOSURE

Welding apparatus for welding a horizontal joint between substantially vertical plates having a pair of horizontally spaced welding units mounted for, angularly adjustable on frame means wherein leading and trailing electrodes extending therefrom are positioned at predetermined angles of inclination with the horizontal joint. Sight means are provided on the frame means for aiming the tips of the electrodes. Heater means are mounted on the frame means for preheating the weld zone prior to the welding operation.

---

This invention relates in general to a method and apparatus for welding. It deals more particularly with a method and apparatus for welding generally vertical plates together along horizontal seams, or three o'clock welding as it is known in the trade.

It is an object of the present invention to provide a new and improved method and apparatus for welding horizontal seams between vertically disposed metal plates.

It is another object to provide a method and apparatus for three o'clock welding wherein a greatly increased amount of weld metal is deposited with each pass of the apparatus at a speed twice that of conventional welding.

It is still another object to provide an improved method and apparatus for three o'clock welding which utilizes high energy input and high electrode travel speed to achieve superior quality welds in minimal time.

It is yet another object to provide a method and apparatus for three o'clock welding wherein by preheating the seam in a predetermined manner the quality of the finished weld is substantially improved.

It is also another object to provide a completely automatic method for horizontal welding, eliminating the usual initial manual pass required at the root of the weld joint, on heavy plate.

It is another object to provide a method and apparatus for three o'clock welding wherein a superior weld is obtained with only a single welder operator.

It is a further object to provide a method and apparatus for three o'clock welding which employs tandem electrodes arranged in predetermined relationship to the horizontal seam to obtain a superior finished weld bead.

It is a further object to provide a method and apparatus for three o'clock welding which employs tandem electrodes including a leading electrode utilizing DC power and a trailing electrode utilizing AC power arranged in such a manner and moved at such a speed that a superior weld may be completed in one tandem pass where conventional methods of three o'clock welding would require two passes.

The foregoing and other objects are realized in accord with the present invention by providing new and improved arrangement of tandem welding electrodes, seam preheating equipment, and sighting means, which cooperate in a high speed, high energy input welding method to achieve a precisely placed and supported weld bead at the seam. More precisely, when the method is practiced on the vertically disposed metal plates of a cylinder structure (an exemplary structure might be 180 feet in diameter with a lower ring of plates being 1.25 inch thick and an upper ring of plates being 1.02 inch thick) it envisions an electrode arrangement including a leading DC powered electrode and a trailing AC powered electrode. The tandem electrodes build up a weld bead at a speed which is approximately twice that achieved by prior art methods, utilizing a power output which is also more than twice that commonly employed.

The electrodes are inclined downwardly toward the seam in parallel planes of travel, with the leading DC electrode plane of travel being slightly above the trailing AC electrode plane of travel. The angles at which the electrodes are arranged relative to the seam being welded, as well as the angles at which these electrodes are arranged relative to each other, are important to and embody features of the present invention. In a first welding pass along the seam, the electrodes are inclined at 30 degrees from the horizontal, downwardly toward the seam. Furthermore, the leading DC electrode is substantially perpendicular to the seam, while the trailing AC electrode is inclined forwardly toward the leading DC electrode at an angle of approximately 15 degrees to a perpendicular from the seam.

In a second tandem pass of the electrodes along the seam during the welding process, the downwardly inclined angle of the electrodes is lowered from 30 degress to 25–27 degrees. The plane of the DC electrode remains slightly higher than the plane of the AC electrode. The welding speed of the second pass is more than 150% of the first pass however.

Precise positioning of the tandem electrode tips and, accordingly, arcs is also critical to and a feature of the present invention. It is essential that an accurate sight be employed to aim the electrode tips toward with the lower lip of the seam being welded during the first tandem welding pass along the seam. For the second tandem pass along the seam, the electrode tips are raised to a position slightly below the upper lip of the seam. The initial weld bead is built up from the lower lip, without undercutting, aided by the relatively lower position of the trailing AC arc (which actually assures the lack of undercutting). The second pass fills the upper portion of the seam and covers the upper lip thereof, while also metallurgically normallizing the weld bead and relieving stresses in the weld, and releasing trapped impurities.

Regarding entrapped moisture which ordinarly causes gas shoots in a finished weld, the present invention also embodies preheating the seam to drive this moisture out in an improved manner. The preheating is accomplished by an elongated gas-fired heater which immediately precedes the welding electrodes along the seam and, at a point immediately in advance of the electrodes, raises the temperature of the base metal to in the neighborhood of about 300 degrees F. when the electrodes reach and direct their welding arcs at that point.

Because of the high power output, the tandem electrodes must travel along the seam at a high speed to retard formation of excess molten metal. It is only with the heater of the present invention that sufficient drying of the weld joint can be obtained to permit such high speeds.

The invention, both as to its organization and method of operation, taken with further objects and advantages thereof, will best be understood by reference to the following description taken in connection with the accompanying drawings, in which:

FIGURE 4 is a diagrammatic horizontal sectional view of the apparatus' welding electrodes during a welding operation;

FIGURE 5 is a diagrammatic vertical sectional view of the electrodes during the first tandem welding pass of the welding process;

FIGURE 6 is a view similar to FIGURE 5 illustrating the electrode relationship during the second tandem welding pass; and FIGURE 7 is a graphic illustration comparing weld bead temperature dissipation time for a conventional single bead welding process and for the tandem arc process of this invention.

Figure 1:
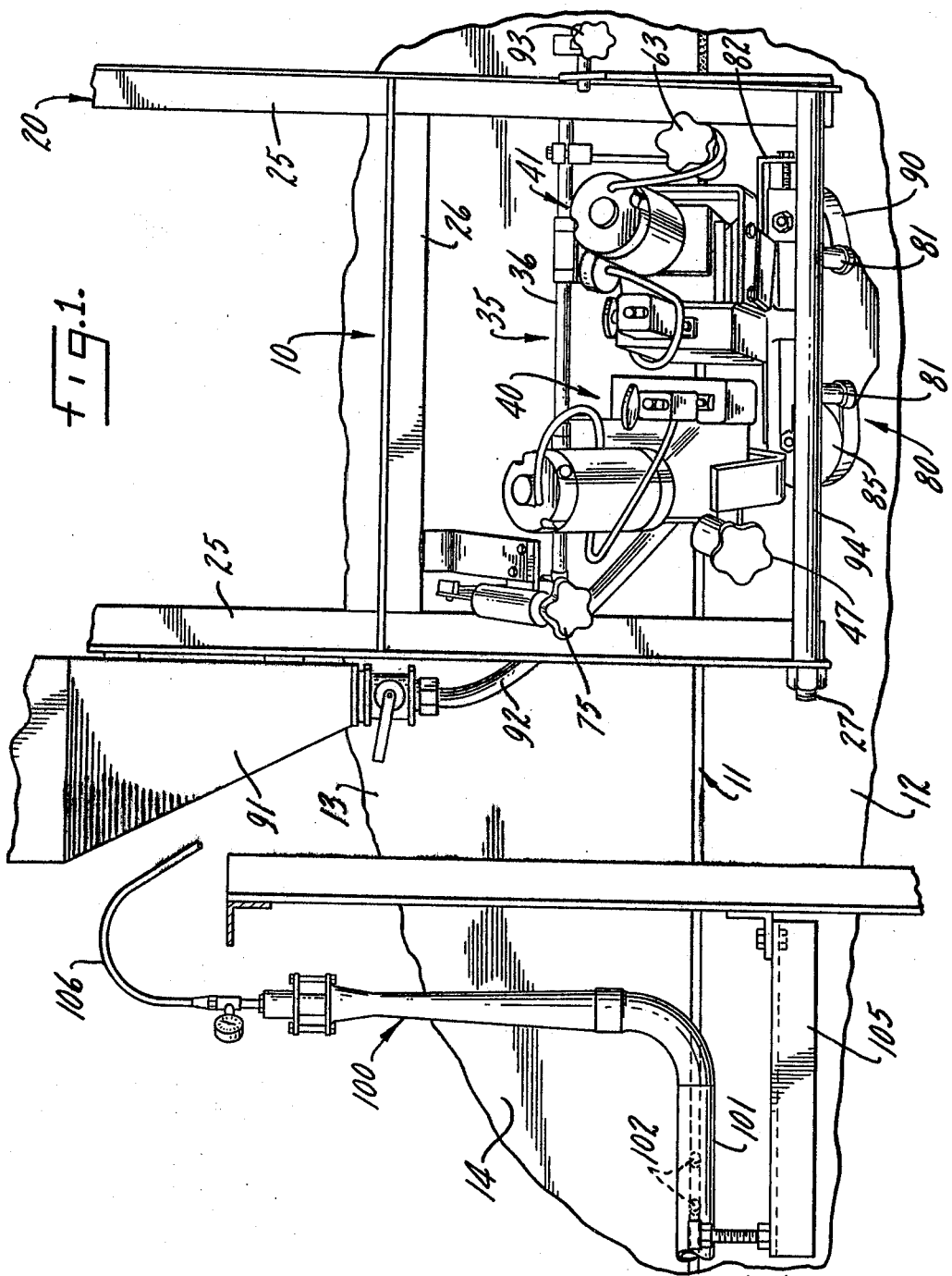
FIGURE 1 is a rear view of the welding apparatus embodying features of the invention, arranged in operative relationship against a tank wall and taken from the operator's position.

Referring now to the drawings, and particularly to FIGURE 1, a welding apparatus embodying features of the present invention is illustrated generally at 10. The welding apparatus 10 is shown in operational position for welding a horizontal seam or joint 11 between vertically disposed plates 12 and 13 in the wall 14 of a large, circular cylindrical storage tank, according to the method of the present invention. The plates are of a thickness previously described.

As seen in FIGURES 5 and 6, the seam (or joint) 11 between the vertically disposed plates 12 and 13 is defined by a squared off horizontal surface 16 on the upper edge of the lower plate 12 and a beveled surface 17 on the lower edge of the upper plate 13. The result is a wedge shaped joint 11 in which the welding apparatus 10 builds up a weld bead 18 according to the present invention.

The welding apparatus 10 comprises a box-like cage 20 (only partially shown) which is suspended on rollers (not shown) from the upper edge of the plate 13. The plates 12 and 13 are initially tack welded together. The cage 20 is adapted to move along the face of the plates 12 and 13, supported by the aforedescribed rollers. Horizontally disposed rollers ride on the face of the tank wall 14 on the lower front of the frame 20 to space the cage from the wall. A suitable prime mover drives the upper rollers to move the cage 20 along the tank wall at a selected speed hereinafter discussed in relation to the method of the invention.

The cage 20 includes a generally rectangular front frame including a pair of vertically extending stringers 25. The vertically extending stringers 25 are joined by an upper horizontal stringer 26 and by a lower horizontal shaft 27. The bottom of the cage 20 is preferably defined by a platform (not shown) upon which the welding operator rides.

Figure 2:
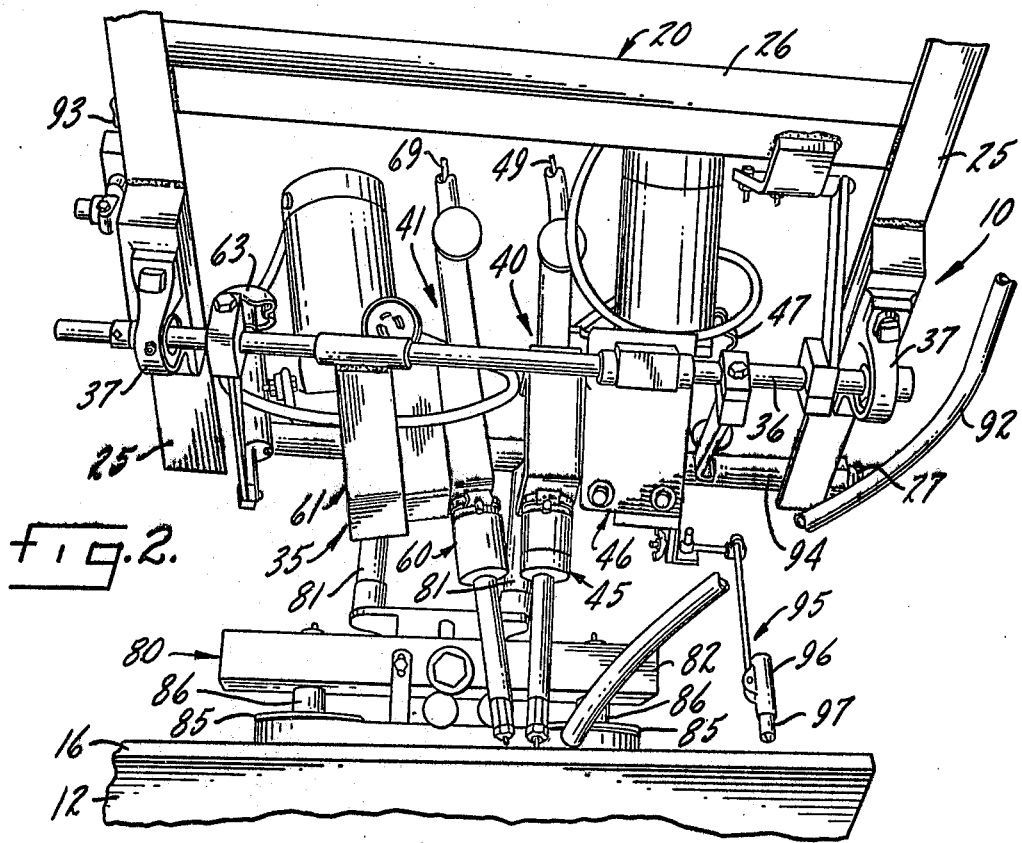
FIGURE 2 is a top perspective view of the welding apparatus seen in FIGURE 1.
Figure 3:
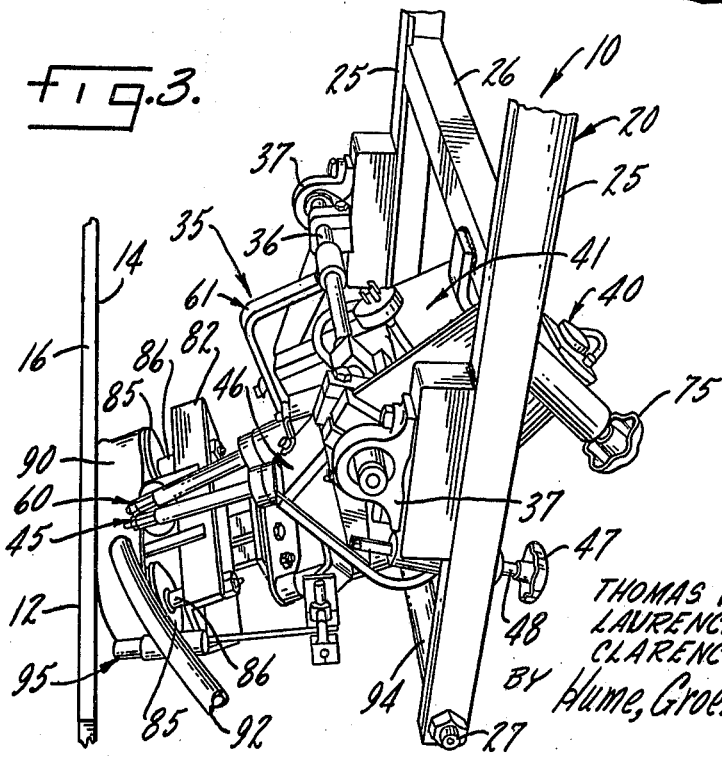
FIGURE 3 is a side perspective of the welding apparatus.

The welding assembly 35 of the apparatus 10 is mounted between the lower ends of the vertical stringers 25 in the manner illustrated in FIGURES 1-3. The welding assembly 35 includes a transversely extending mounting shaft 36 which is rotatably journaled in bearing blocks 37 suitably secured to the vertical stringers 25 of the frame 20 facing the tank wall 14. Mounted in bearing relationship on the shaft 36 for independent rotation relative to it are a leading welding unit 40 and a trailing welding unit 41.

The leading welding unit 40 comprises a conventional arc welding head 45 extending transversely of the shaft 36 and secured to a mounting plate structure 46 journaled on the shaft. The plate structure 46 is rotated on the shaft to adjust the angular relationship of the head 45 relative to the wall 14 by manipulating an elevation control 47. The elevation control 47 is a standard Lincoln Electric Co. welding head elevation adjuster and comprises an adjustment knob and threaded pin 48 mounted on the plate structure 46 and operatively connected to the shaft 36 so that its conventional screw-type adjustment is effective to rotate the plate structure and head 45 on the shaft 36.

The welding head 45 receives a continuous wire electrode 49 from a wire reel (not shown) suitably secured on top of the frame 20. The wire electrode 49 is drawn from the reel in a well-known manner by a conventional electrode feed in the head 45 and fed through the head at a predetermined fixed rate determined by a combination of factors, including the rate of travel of the welding apparatus 10 along the seam 11, a rate which is substantially higher than that previously employed in similar welding operations, and the voltage and current levels employed.

The trailing welding unit 41 is mounted on the shaft 36 in a manner similar to the unit 40. As such, the trailing unit 41 includes a conventional welding head 60 suitably attached to a mounting plate structure 61. The head 60 is mounted on the plate structure 61 in such a manner that it depends slightly below the head 45, however; preferably $\frac{1}{32}$ inch. The functional effect of this relationship is important to the invention and will hereinafter be discussed. In addition, as shown in FIGURE 4, the head 60 is angled forward toward the head 45 at an angle of 15 degrees to a perpendicular from the seam 11.

The mounting plate structure 61 is journaled on the shaft 36 for rotation relative thereto to adjust its angular relationship on the shaft. The angular relationship of the head 60 relative to the tank wall 14 is varied by adjusting it on the shaft 36 with an elevation control 63. The elevation control 63 is identical in construction and operation to the control 47 hereinbefore discussed.

Electrode wire 69 for the head 60 is taken from a wire reel (not shown) suitably mounted on top of the cage 20 adjacent the reel hereinbefore described. Wire is drawn from the reel 70 by a conventional electrode wire feed in the head 60 and fed through the head 60 in a well known manner.

In addition to the heads 45 and 60 being rotatable on the shaft 36 for angular adjustment relative to each other, the shaft 36 itself is rotatable in its bearing blocks 37 to permit simultaneous adjustment of the angularity of the heads 45 and 60 relative to the tank wall, and, accordingly, the seam 11. This adjustment is achieved by a master elevation control 75 mounted on the frame 20 for threaded adjustment relative thereto. The control 75 is identical to the controls 47 and 63 and is effective to rotate the shaft 36 about its axis.

Adjustably mounted on the frame 20 immediately below the head assemblies 40 and 41 is a flux belt assembly 80. The flux belt assembly 80 includes supporting arms 81 which are secured to a sleeve 94 rotatable on the shaft 27 mounted in the frame 20 and a transversely extending belt support bar 82 secured to the outer ends of the arms 81. The belt support bar 82 mounts a pair of outwardly extending rollers 85 in journaled relationship for rotation on shafts 86. A conventional flux-support bolt 90 encircles the rollers 85 and is adapted to support flux deposited at the seam 11 immediately adjacent the welding heads 45 and 60 from a flux reservoir 91 through a pipe 92 in a well-known manner.

The height of the flux belt assembly 80 is adjusted by rotating the sleeve 94 on the shaft 27 with an elevation control 93. The elevation control 93 is identical in construction and operation to the controls 47 and 63 hereinbefore discussed. Accordingly, the control 93 is not described in detail.

Mounted adjacent the flux belt assembly 90 on the plate structure 46 is a seam sighting assembly 95. The seam sighting assembly 95 includes a tubular enclosed light source 96 and a jeweler's focusing lens 97. The lens 97 concentrates a narrow beam of light which is coordinated with the position of the heads 45 and 60 to aim them precisely relative at a selected point in the seam 11 as the apparatus 10 proceeds along in welding the seam. The sighting assembly 95 is adjustable on the plate structure 46, of course. Sighting according to the method of the present invention will hereinafter be discussed.

Also mounted on the cage 20 extending forwardly of the front stringer 25 in the direction of travel of the apparatus is a seam preheat assembly 100. The seam preheat assembly 100 includes a horizontally elongated burner tube 101 having a horizontally spaced series of burner apertures 102 formed therein facing the tank wall and the seam 11. The burner tube 101 is mounted on and secured to the leading stringer 25 by an adjustable bracket arrangement 105 in a conventional manner. The burner is fueled by propane gas or the like through a propane inlet line 106 from a suitable source and is adapted to preheat the weld seam according to the invention in a manner hereinafter discussed.

Turning now to the method of welding embodying features of the present invention, the welding apparatus 10 suspended from the upper edge of the plate 13 is positioned at a predetermined point on the aforementioned joint 11 on the wall 14 to weld the joint 11, which is horizontally disposed, as has been pointed out. The leading welding unit 40 is adjusted on the shaft 36 so that it is inclined downwardly at an angle of 30 degrees. It extends perpendicular to the seam. The trailing welding unit 41 is also adjusted on the shaft 36 until it too is inclined downwardly toward the seam at an angle of about 30 degrees.

In this relative position of the units 40 and 41, the trailing unit 41 has its electrode wire 69 positioned 1/32 inch below the electrode wire 49 of the leading welding unit 40 and in a parallel plane of travel relative thereto. In addition, the electrode wire 69 of the trailing welding unit 41 is inclined forwardly towards the electrode wire 49 at an angle of 15 degrees, as seen in FIGURE 4.

With the welding unit 40 and 41 arranged in the foregoing manner, controls are adjusted in a suitable manner to place the electrode tips of the electrodes 49 and 69 in alignment with the lower lip of the wedge shaped seam 11, as illustrated in FIGURE 5. With the electrodes 49 and 69 aimed in this manner, the sighting assembly 95 is adjusted so that its light beam spot strikes the seam 11 at the lower lip of the seam 11, albeit ahead of the welding electrodes. In this way, when the welding process has begun and the welding electrode tips are buried in flux, a reference to the spot at which the light beam strikes the seam 11 provides a precise aiming point.

Also adjusted at this point is the seam preheat assembly 100. The preheat assembly 100 is adjusted on its mounting bracket arrangement 105 so that the burner tube 101 extends precisely parallel to the seam 11, with its burner apertures 102 aimed thereat, when the welding electrodes are properly aligned with the seam.

Finally, the flux belt assembly 80 is adjusted, by rotating its mounting sleeve 94 on the shaft 27, into a position against the plates 12 and 13 and immediately beneath the seam 11. A predetermined amount of flux is then deposited on the belt and along its length, thereby covering the seam 11 along the length of the flux belt. The reservoir 91 on the cage 20 subsequently supplies needed flux as the apparatus 10 moves along welding the seam 11.

With the welding electrode arranged as illustrated in FIGURES 4-6, DC power is supplied to the leading electrode 49 and AC power to the trailing electrode 69. The power deployed through the leading electrode is 675 amps at 34 volts. The trailing electrode carries 650 amps at 42.5 volts. the 1/8 inch electrode wires thus throw into the joint 11 an amount of energy equal to 126,500 joules per inch of weld, much more than that which is conventional in single head welding. The calculations for this exemplary energy input are as follows:

DC Arc:

$$\text{Energy} = \frac{675 \text{ amps} \times 34 \text{ volts}}{24 \text{ in./min. Speed} \times 60 \text{ min./hr.}} = 16 \frac{\text{Watt-hrs.}}{\text{Inch of Weld}}$$

$$16 \frac{\text{Watt-hrs.}}{\text{Inch}} \times 3{,}600 = 57{,}500 \frac{\text{Joules}}{\text{Inch of Weld}}$$

AC Arc:

$$\text{Energy} = \frac{650 \text{ amps} \times 42.5 \text{ volts}}{24 \text{ in./min. Speed} \times 60 \text{ min./hr.}} = 19.2 \frac{\text{Watt-hrs.}}{\text{Inch of Weld}}$$

$$19.2 \frac{\text{Watt-hrs.}}{\text{Inch}} \times 3{,}600 = 69{,}000 \frac{\text{Joules}}{\text{Inch of Weld}}$$

DC Energy = 57,500 Joules/Inch of Weld
plus
AC Energy = 69,000 Joules/Inch of Weld
Total Energy = 126,500 Joules/Inch of Weld It will also be seen from the following calculations that the total output of power is:

DC Power = 675 amps × 34 volts = 23,000 watts
AC Power = 650 amps × 42.5 volts = 27,600 watts
Total Power = 50,600 watts As the tandem welding heads 45 and 60 move along the seam 11, the lead DC electrode arc penetrates deeply into the joint to build up a weld bead deep in the seam. At the same time, the trailing AC arc effectively covers the lower lip of the seam with weld bead build up and simultaneously relieves stresses in the first pass bead. Even with a welding speed of approximately 24 inches per minute, which is approximately double that of any such similar welding operation, the great amount of energy applied by the two electrodes to the weld joint allows slower cooling of the weld bead which, in turn, results in lower stress development in the finished bead.

In addition, as the welding electrodes are moved along the seam 11 to build up a weld bead, the trailing AC electrode is pointed at a 15 degree angle toward the direction of travel and toward the leading DC electrode, as has been pointed out. As a result, the force of the leading electrode arc, which has a tendency to blow the trailing electrode arc backward, is counteracted, and a resultant vector force of the two electrodes is substantially perpendicular to the seam 11. Furthermore, since the AC electrode has specifically been positioned 1/32 inch below the leading DC electrode, in a parallel plane of travel relative thereto, the trailing AC electrode effectively covers the lip of the lower surface 16.

To assure an anhydrous condition at the seam 11, the preheat assembly 100 preheats the seam immediately in advance of the welding heads 45 and 60 to a temperature of approximately 300 degrees F. This preheating is accomplished along a span of approximately 18 inches of the seam in advance of welding so that the plates 12 and 13 in the area of the seam 11 are thoroughly heated when the welding arcs arrive. Accordingly, virtually all of the moisture has been driven from the area and the development of gas shoots in the final weld is substantially avoided.

After an initial weld bead has been developed in the seam 11, in the manner hereinbefore described, the welding apparatus 10 is moved back to the start of the weld and a second welding pass is made. According to the invention, the welding conditions are changed slightly for the second pass.

Initially, the angle of both electrodes 49 and 69 is lowered from 30 degrees to from 25 to 27 degrees to the horizontal. This is accomplished with the simultaneous adjustment assembly 75 which rotates the entire shaft 36 upon which the weld heads 45 and 60 are mounted. The welding electrodes are also re-aimed at the seam so that their tips and the arcs developed are pointed slightly below the upper lip of the seam 11.

With the welding electrodes arranged in the aforedescribed manner, a second tandem pass broadly similar to the first welding pass is accomplished. The welding head speed is increased to 42 inches per minute. The power output is set at 34,000 watts total for both heads.

As seen in FIGURE 6, a seam filling bead is built onto the first bead. Again the extensive preheating by the preheating assembly 100 prepares the seam and first bead for the weld, driving any accrued moisture therefrom.

After the second welding pass on one side of the tank wall 14, two tandem arc welding passes are made with the same apparatus on the back side of the joint 11. As will be recognized, the back side of the joint 11 is identical in configuration to the front side of the joint previously described.

The first welding pass on the back side of the seam 11 produces a bead, illustrated in FIGURE 6, which is identical to the first bead pass on the front side. This tandem arc pass produces a relatively large cross-sectional area bead which consequently distributes stresses over a large area, making for a superior weld. Subsequently, a second pass is also made to normalize the bead and cover the seam 11. Without the tandem pass (i.e., single head welding) the bead deposited on the second side of the weld joint would be of too small a cross-section to resist the tensile stress caused by cooling and other factors. Thus, on single head welding of heavy plate, it is usually first necessary to apply a laborious manual pass into the root of the weld joint to build up the bead initially to prevent cracking of the single head pass. Tandem welding by the present method eliminates this extra procedure.

A high speed welding method and apparatus for horizontal seams has been described which requires only a single operator yet produces a weld vastly superior to known methods. Very high energy levels are employed, producing a penetrating weld bead, with a considerable melt. The high speed of arc travel forestalls the sagging of molten metal by the effect of gravity, however.

Weld bead cooling does take place at a slower rate with this tandem arc method, however. As seen in FIGURE 7, the bead cools slowly and relatively evenly. This pace allows for better grain structure formation and a better weld.

Although the method of the present invention has been described in terms of two tandem arc passes developing the weld bead on each side of the joint 11, it should be recognized that this procedure is designed primarily for relative heavy plates. If, for example, the plate thickness is less than 1 (one) inch, it has been found that a single tandem arc pass on each side of the joint is usually sufficient to develop a very satisfactory and even superior weld bead. Again, it will be recalled, that this single pass tandem arc welding process is accomplished at twice the speed of single arc welding.

We claim:

1. A method of welding a generally horizontal joint between substantially vertical plates having a thickness of on the order of one inch or greater utilizing tandem welding unit means including a leading electrode and a trailing electrode, comprising the steps of:
    (a) positioning said welding unit means on one side of said plates with said electrodes arranged so that both are inclined downwardly at a first predetermined angle and their tips are disposed immediately adjacent the lower lip of said joint with said trailing electrode spaced for travel in a plane parallel to and slightly lower than the plane of travel of said leading electrode,
    (b) moving the welding unit means along the joint in an initial pass at a speed in excess of twenty inches per minute while supplying sufficient electrical power collectively to the electrodes to impart in excess of 100,000 joules of energy per inch of weld to the joint,
    (c) preheating said joint immediately in advance of said welding unit means to the extent that at the spot where welding is taking place at any given time the metal at said joint in the area of said spot has been preheated to a temperature of in the neighborhood of 300° F.,
    (d) repositioning said welding unit means for a second welding pass along the same joint on said one side of said plate with the tips of said electrodes raised so that they are disposed immediately adjacent to and only slightly below the upper lip of said joint, and
    (e) making a second welding pass along said joint.

2. The method of claim 1 further characterized by and including the steps of:
    (a) making said second welding pass at a speed of in excess of thirty inches per minute while supplying at least 30,000 watts of power collectively to said electrodes,
    (b) again preheating said joint immediately in advance of said welding unit means as it makes its second welding pass to the extent that at the spot where welding is taking place at any given time the metal at said joint in the area of said spot has been preheated to a temperature of in the neighborhood of 300° F., and
    (c) positioning said welding unit means for said second pass with said electrodes arranged so that both are inclined downwardly at a predetermined angle less than said first predetermined angle.

3. The method of claim 1 further characterized by and including the steps of:
    (a) positioning said welding unit means on the opposite side of said plates with said electrodes arranged so that both are inclined downwardly at said first predetermined angle and their tips are disposed immediately adjacent the lower lip of said joint with said trailing electrodes spaced for travel in a plane parallel to and slightly lower than the plane of travel of said leading electrode,
    (b) moving the welding unit along the joint in an initial pass at a speed of in excess of twenty inches per minute while supplying sufficient electrical power collectively to the electrodes to impart in excess of 100,000 joules of energy per inch of weld to the joint,
    (c) preheating said joint immediately in advance of said welding unit means to the extent that at the spot where welding is taking place at any given time the metal at said joint in the area of said spot has been preheated to a temperature of in the neighborhood of 300° F.,
    (d) repositioning said welding unit means for a second welding unit pass along the same joint on said opposite side of said plates with the tips of said electrodes raised so that they are disposed immediately adjacent to and only slightly below the upper lip of said joint, and
    (e) making a second welding pass along said joint on said opposite side of said plates.

4. The method of claim 3 further characterized in that:
    (a) making said second welding pass on said opposite side of said plates at a speed of in excess of thirty inches per minute while supplying at least 30,000 watts of power collectively to said electrodes,
    (b) again preheating said joint immediately in advance of said welding unit means as it makes its second welding pass to the extent that at the spot where welding is taking place at any given time the metal at said joint in the area of said spot has been preheated to a temperature of in the neighborhood of 300° F., and
    (c) positioning said welding unit means for said second pass with said electrodes arranged so that both are inclined downwardly at a predetermined angle less than said first predetermined angle.

5. The method of claim 1 further characterized in that:
    (a) said leading electrode is supplied with DC current and said trailing electrode is supplied with AC current.

6. The method of claim 5 further characterized in that:
    (a) said first predetermined angle of inclination of said electrodes is substantially thirty degrees to the horizontal, while said second predetermined angle of inclination of said electrodes is substantially twenty-five to twenty-seven degrees to the horizontal.

7. An apparatus for welding a generally horizontal joint between substantially vertical plates in a tank wall or the like wherein the plates have a thickness of on the order of one inch or greater, comprising:
  (a) generally vertically disposed frame means adapted to be mounted adjacent said wall for horizontal travel along a selected joint,
  (b) a pair of horizontally spaced welding units mounted on said frame means including a leading welding unit having a leading electrode and a trailing welding unit having a trailing electrode,
  (c) said units being angularly adjustable on said frame means to facilitate variation of the angle of inclination of said electrodes to said plates,
  (d) said trailing unit being arranged so that its electrode will travel in a plane parallel to and slightly lower than the plane of travel of the leading electrode in the leading welding unit,
  (e) sight means on said frame means for precisely aiming the tips of said electrodes at a predetermined point relative to upper and lower lips of said joint,
  (f) and heater means mounted on said frame for heating the metal in the area of said joint in advance of said welding units,
  (g) said heater means being horizontally aligned with said electrode tips and elongated in the direction of said alignment in advance of said units.

8. The apparatus of claim 7 further characterized in that:
  (a) said heater means includes an elongated heater element at least eighteen inches in length.

References Cited
UNITED STATES PATENTS

| | | | |
|---|---|---|---|
| 1,298,590 | 3/1919 | Smith | 219—60 |
| 1,495,272 | 5/1924 | Stresau | 219—60 |
| 2,489,002 | 11/1949 | Babbitt | 219—73 |
| 2,667,559 | 1/1954 | Arnold | 219—126 |
| 2,763,770 | 9/1956 | Arnold. | |
| 2,837,627 | 6/1958 | Soulary. | |
| 2,866,078 | 12/1958 | Ballentine et al. | 219—126 |
| 2,900,487 | 8/1959 | Danhier. | |
| 2,916,605 | 12/1959 | Lucas. | |
| 3,035,159 | 5/1962 | Deville et al. | |
| 3,171,944 | 3/1965 | Linnander. | |
| 3,197,604 | 7/1965 | Turbyville et al. | |
| 3,300,618 | 1/1967 | Sciaky | 219—121 |
| 3,303,321 | 2/1967 | Harmsen et al. | 219—126 |

JOSEPH V. TRUHE, Primary Examiner
W. D. BROOKS, Assistant Examiner

U.S. Cl. X.R.
219—73